Figure 8:
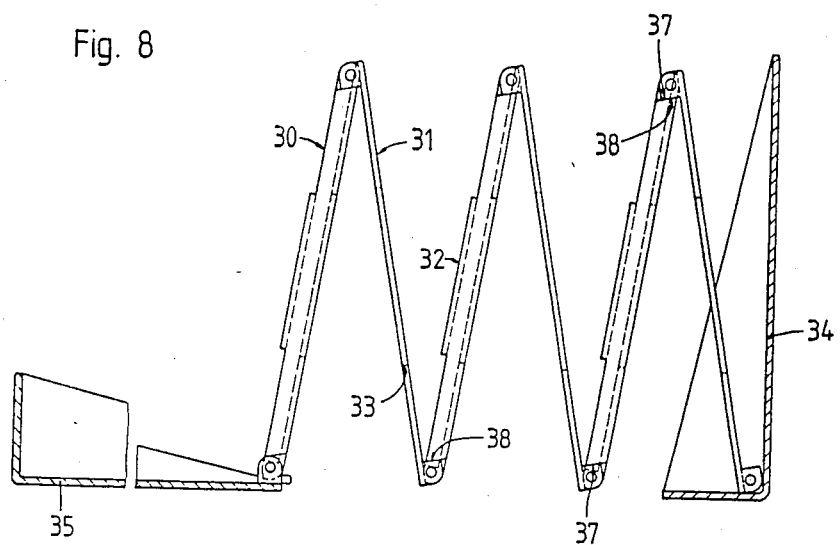

United States Patent [19]
Seifert

[11] Patent Number: 4,765,469
[45] Date of Patent: Aug. 23, 1988

[54] MULTISECTIONAL STORAGE CONTAINER

[75] Inventor: Josef Seifert, Grosselfingen, Fed. Rep. of Germany

[73] Assignee: Kurz Kunststoffe GmbH, Owingen, Fed. Rep. of Germany

[21] Appl. No.: 9,774

[22] Filed: Feb. 2, 1987

[30] Foreign Application Priority Data

Feb. 5, 1986 [DE] Fed. Rep. of Germany ....... 3603383

[51] Int. Cl.4 ............................................ B65D 85/57
[52] U.S. Cl. .................................. 206/309; 206/444; 211/40; 211/41; 211/149
[58] Field of Search ..................... 206/44 R, 307, 309, 206/311, 387, 444, 445, 449; 211/40, 41, 130, 149, 200–203, 187, 195; 312/9–13, 123, 126, 127, 272

[56] References Cited

U.S. PATENT DOCUMENTS

| | | | |
|---|---|---|---|
| 2,584,489 | 2/1952 | Morrison | 211/149 |
| 2,850,344 | 9/1958 | Cook | 312/272 |
| 2,961,101 | 11/1960 | Hutton | 211/149 |
| 4,502,596 | 3/1985 | Saetre et al. | 229/69 |

FOREIGN PATENT DOCUMENTS

| | | | |
|---|---|---|---|
| 0367389 | 1/1923 | Fed. Rep. of Germany | 206/311 |
| 1474979 | 2/1967 | France | 211/149 |
| 0453883 | 12/1949 | Italy | 229/1.5 R |
| 0332975 | 8/1930 | United Kingdom | 206/311 |

Primary Examiner—Jimmy G. Foster
Attorney, Agent, or Firm—McAulay, Fields, Fisher, Goldstein & Nissen

[57] ABSTRACT

In a multisectional storage container, especially a storage box for the storage of plate- or disk-shaped items, such as compact disks or diskettes, for example, it is proposed that individual storage sleeves be interconnected one with the other in an articulated manner by means of interconnecting means in such a manner that the sequence of sleeves can be opened in the nature of a parallelogram mechanism or in an accordian-like manner, thus enabling all of the items that are contained therein to immediately be visually inspected and identified and/or manually removed. By subsequently collapsing the individual storage sleeves of the storage box, it is possible to house them in a minimum of space, without any clearance one between the other, and, if desired, to store them in a dust-tight manner by means of an enveloping enclosure.

18 Claims, 4 Drawing Sheets

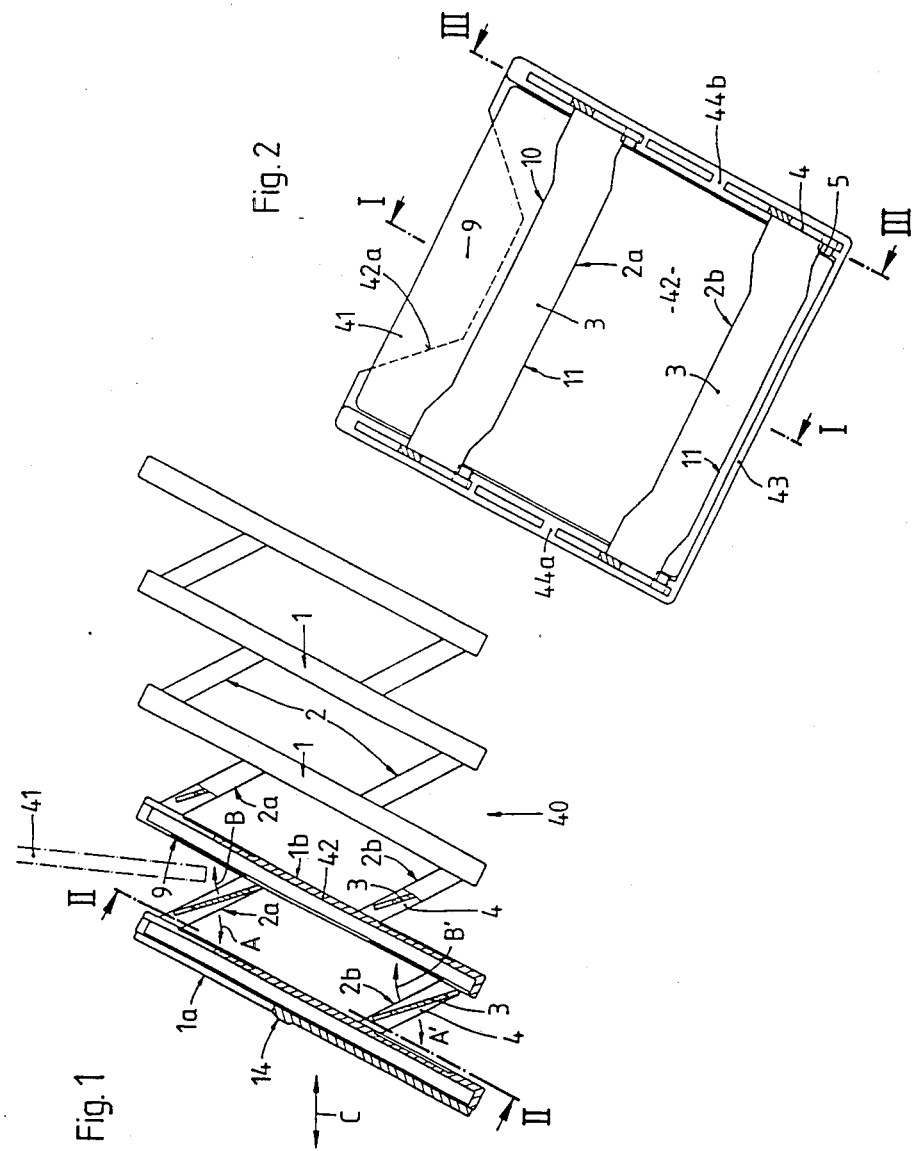

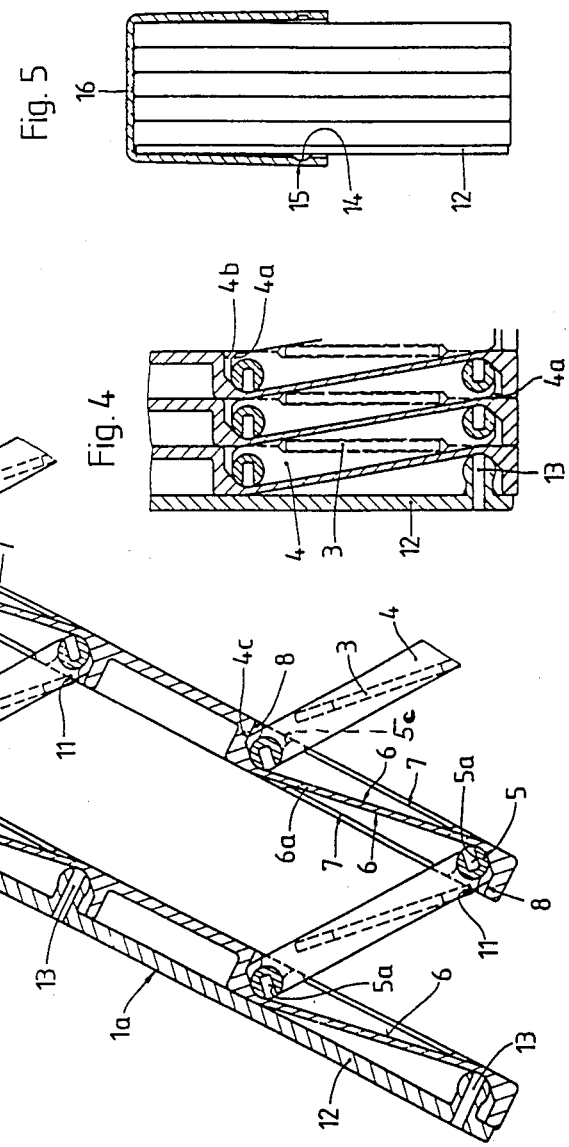

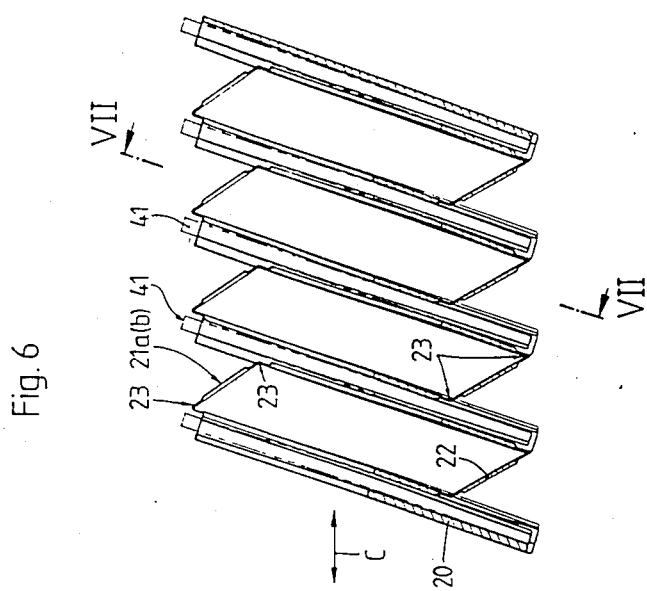
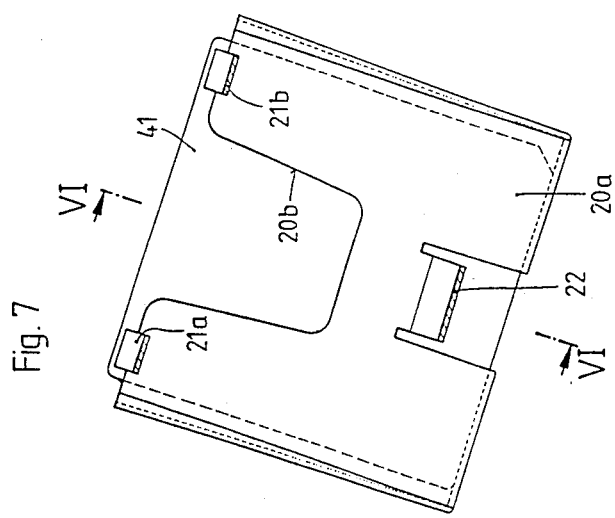

MULTISECTIONAL STORAGE CONTAINER

PRIOR ART

The present invention relates to a multisectional storage container of the type set forth in the heading portion of the main claim. Multisectional storage containers for flat items, such as for plate- or disk-shaped items, for example are known. If phonograph records comprise portions of a complete recording of an artistic work, for example, they are supplied in albums which contain a stack of phonograph records, the stack consisting of at least two phonograph records which are packed separately in individual paper sleeves, for example; this clearly represents the simplest form of a multisectional storage container. It is also known practice for a multisectional container having flat compartments or storage sleeves whose one, bottom, end connects all of the sleeves which are to be opened or extended in a fan-like manner at the other end, much like collapsed Japanese paper garden lanterns are opened, with each of the inwardly tapered container sleeves then opening in an arc-like manner. However a disadvantage of a container of this type is that only very thin items, such as sheets of paper, etc, for example, can mainly be arranged therein, as the respective storage sleeve has a significant inward taper in the opened position and, when in the closed position, the individual sleeves are pressed together to the thickness that is stipulated by the bottom connecting portion. Insertion and secure storage, as well as easy accessibility of such plate- or disk-shaped items of the type that are customarily employed in the form of known audio or data media, such as compact disks or diskettes, is not possible in the case of this type of storage container.

It is also possible to arrange certain plate- or disk-shaped items, such as the above-mentioned computer diskettes, in stacks and to store them in this manner; however if the user then desires to select a given diskette for use, conventional storage possibilities require that the entire stack of available diskettes be leafed through by hand, i.e each individual container in which a diskette is stored must be physically manipulated and turned over. This is disadvantageous and cumbersome and, in particular, does not represent an optimum form of storage for small plate- or disk-shaped items.

It is therefore the object of the present invention to create a multisectional storage container, such as a storage box for plate- or disk-shaped, i.e. flat, items of the type that are in widespread use in the form of so-called compact disks or diskettes, for example, with which these items can be stored and kept in an optimum and proper manner, while nevertheless permitting the entire storage system to be prepared, by means of a simple manipulation, in such a manner as to provide direct access to a specific item which is stored therein and, in a special embodiment of the present invention, to afford immediate identification, by means of a visual labelling area, for example, without the need for having to additionally leaf through the plate- or disk-shaped items.

ADVANTAGES OF THE INVENTION

The present invention solves this object by means of the characterizing features of the main claim and offers the advantage, by means of the storage system according to the present invention, of permitting plate- or disk-shaped items, i.e. compact disks or diskettes, in particular, to be handled easily and, in addition, to be readily available, even if they are still contained in a protective housing, whereby all of the items that have been stored and kept can be immediately identified merely by opening the multisectional storage container according to the present invention, i.e. by extending it apart. This is accomplished in that the individual sleeves have cutouts or openings in at least those areas in which the plate- or disk-shaped items that are contained therein are provided with lettering, symbols or other visual identification means. Consequently, a user is able to immediately view all labelling areas of diskettes, for example, with the desired diskette then being available immediately for removal.

The thickness of the storage box or storage system that is thus formed amounts to only little more than the thickness of the plate- or disk-shaped items that are stored therein, which, for the sake of simplicity, will hereinafter merely be termed diskettes, although it should be understood that this term "diskette", which will be used throughout hereinafter, shall not be deemed to in any way limit or restrict the scope of the present invention and that the present invention is therefore also suitable for storing, keeping and providing expedient access to any desired types of plate- or disk-shaped items. The storage system according to the present invention is especially well suited for storage of smaller diskettes, $3\frac{1}{2}''$ or $3''$ diskettes, for example, although in principle, of course, larger data or audio media can also be stored, such as $5\frac{1}{4}''$ or $8''$ diskettes, for example. These dimensions, also are given merely by way of example and should not be understood as being in any way restrictive.

In the case of these kinds of diskettes, as well as compact disks, it is customary for the magnetic, disk-shaped medium or the compact disk, with its extremely fine markings that are scanned by laser light, to be enveloped in a (plastic) enclosure in order to thus largely afford them protection against damage. Moreover, the read slot can also be covered by means of suitable means, such as a slide, for example, in order to prevent damage to the data or audio medium, even in the event of improper handling (such as fingerprints, for example). Data media with additional envelopes or protective enclosures of this type are particularly well suited for the storage system according to the present invention, although the present invention can not only be employed as a storage system in the field of data processing, but in the field of entertainment electronics (audio and video), as well.

And, finally, it is especially advantageous to effect the connection of the individual sleeves of the container that produce a one-piece storage container by means of interconnecting means, each of which is articulated to the two adjacent sleeves in such a manner that, when the multisectional storage container is opened, all sleeves are drawn apart, yet remain in the same plane, while merely assuming an oblique attitude, which is desired by the user, and freeing them for visual inspection or manual access to the stored diskette (in its protective enclosure).

Further embodiments and enhancements of the present invention are the subject of the subclaims, in which they are set forth. Especially advantageous here is the possibility of being able to fabricate a multisectional storage container completely in one piece by means of a uniform injection moulding process, with each of the connecting means being attached to the adjacent storage sleeves by means of articulated, one-piece film hinges. The arrangement of the individual sleeves, with the accompanying one-piece joints and the connecting members or transitional surfaces, can be effected in such a manner as to permit the complete component to be injection moulded in one piece from plastic, without the need for lateral slides or similar elements which would increase cost and complicate the fabrication process. When the storage box which has been fabricated in this manner is closed, the elastic film hinges then serve as spring elements, so that the individual storage sleeves then automatically extend apart when a complementary slide-over cover hood is removed. Fabrication of a storage box of this type is especially cost-efficient.

Moreover, in a further practical example of the present invention, it can be favorable for front and rear partial cover hoods to be disposed directly on the last storage sleeve or on a last connecting member in such a member as to produce a completely enclosed, one-piece unit by means of precisely this surrounding enclosure when the storage container is pushed together and collapsed.

DRAWINGS

Figure 9:
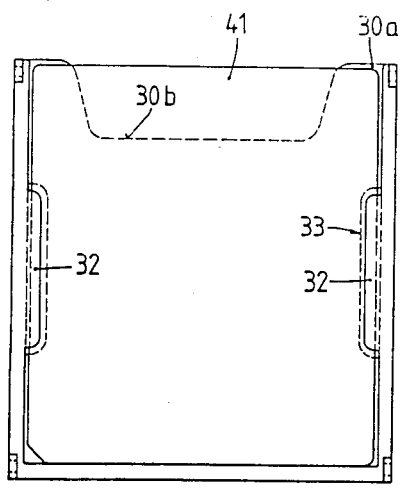
Figure 10:
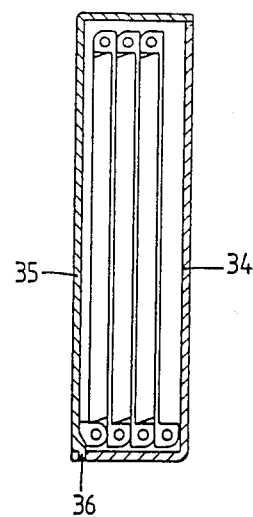

The above discussed and other objects, features and advantages of the present invention will become more apparent from the following description thereof, when taken in connection with the practical examples shown in the accompanying drawings, in which FIGS. 1 to 5 show a first embodiment having dual intermediate connecting means attached in an articulated manner in such a way as to permit this storage box to be opened and closed in a manner similar to a parallelogram, whereby FIG. 1 shows a side view of the individual sleeves that form the storage container, with connecting means, a portion thereof in a cross-sectional representation, and FIG. 2 shows a top view of one of the sleeves that form the multisectional storage container, taken along line II—II of the cross-sectional representation in FIG. 1, and FIG. 3 shows a partial section, on a larger scale, of the area of the articulated mounting means of the intermediate connecting means taken along line III—III in FIG. 2, with a section taken along line I—I being shown additionally in FIG. 2, which corresponds to the partial sectional area in FIG. 1, and FIG. 4 shows a partial sectional representation similar to the representation shown in FIG. 3, however with the individual sleeves in the collapsed state, and FIG. 5 shows a lateral representation of all of the individual sleeves that form the multisectional storage container as a whole, in a form that is suitable for storage purposes, i.e. collapsed or folded together and supplemented by a cover hood which is slid thereover;

FIGS. 6 and 7 show a further practical example of the present invention, which is fabricated in one piece by means of an injection moulding method, in which namely FIG. 6 shows a lateral sectional representation taken along line VI—VI in FIG. 7—the representation is not drawn to perspective—, in which the individual sleeves are also interconnected one with the other in the nature of a parallelogram opening mechanism, and FIG. 7 shows a top view of one of the sleeves, for example taken along sectional line VII—VII in FIG. 6;

and, finally, FIGS. 8 to 10 show a further practical example, in which the respective connecting members or means are connected to the sleeves which are located adjacent thereto in a V-shaped manner when in the extended position, in which FIG. 8 shows a lateral representation, FIG. 9 shows a top view of one of the sleeves, and FIG. 10 shows this practical example with the enclosed enclosure form, with the multisectional storage container being in the collapsed state.

DESCRIPTION OF PRACTICAL EXAMPLES

Referring now to the drawings, where like reference numerals designate like parts throughout the several views, it will be seen that the underlying concept of the present invention is to create a multisectional storage container for any type of plate- or disk-shaped items, which can also display a substantial thickness, and in which individual storage sleeves for these items, which will be termed diskettes hereinafter, are formed which are interconnected one with the other in an articulated manner in such a way that they are spaced equidistantly at all points one from the other when the storage container is opened, while nevertheless remaining in the plane of the opening direction, i.e. they do not fold out radially about a common fulcrum.

In the practical example shown in FIGS. 1-5, in which the individual sleeves possess a parallelogram interconnecting mechanism, the multisectional storage container 40 comprises a given, yet freely selectable number of individual sleeves 1 for holding the plate- or disk-shaped items or diskettes 41. Sleeves 1, which are arranged in line, are interconnected one with the other in an articulated manner in which the sleeves 1 remain parallel to one another by means of interconnecting means 2; in the embodiment shown in FIG. 1, which is based upon a parallelogram mechanism, this is accomplished by means of an upper hinge joint $2a$ and a lower hinge joint $2b$ for each sleeve. Since both upper and lower hinge joints $2a$ and $2b$ are connected in an articulated manner where they abut the sleeves 1 to which they are associated, i.e. the adjacent storage sleeve (front and rear storage sleeves $1a$ and $1b$), the upper and lower hinge joints can be collapsed on both sides in the direction of the associated sleeves, as shown by arrows A and A', as well as B and B'; consequently, the basic function of the present invention, demonstrated here by the practical example which is shown in FIG. 1, produces a basic function in which, when the sleeves in their entirety are moved in the direction of double-headed arrows C, the individual sleeves can be either extended apart from one another in the form of an accordian by means of the parallelogram mechanism that is ensured by upper and lower hinge joints $2a$, $2b$ or collapsed together in such a manner that, in accordance with a preferred embodiment of the present invention, they are then arranged one against the other without any clearance therebetween and in a superimposed manner.

Through the employment of any desired number of sleeves, it is therefore possible to form storage systems, i.e. multisectional storage containers, in this manner which offer differing storage capacities, for example five-sleeve and ten-sleeve storage boxes, whereby, since all sleeves and all interconnecting means are of identical design, only one injection moulding tool is required in each case if the storage system, as a whole, is fabricated of a suitable plastic, for example. The individual hinge joints are then produced by means of catches and/or snaps.

It is obvious, and this shall apply with respect to the following practical examples, that plastic is a preferred material for the fabrication of the embodiments of a storage system according to the present invention, so that the individual components can be produced by means of injection moulding methods or fabrication in specific moulds—However it would also be within the scope of the present invention to fabricate the individual components of films or of a suitable cardboard material, by stamping material from a reel and appropriately folding and bonding or welding the components one with the other, for example, whereby it will not be necessary to discuss this aspect in greater detail, as the following detailed explanations of the practical examples of the present invention can be implemented equally well if they are fabricated of cardboard, of plastic films or of similar materials.

Each individual sleeve 1 comprises a panel-shaped back 42 which is completely surrounded on the sides and at the bottom by a raised edge, preferably in a one-piece manner, having the configuration of a U-shaped rib, with the bottom leg 43 of the U serving as the bottom stop for the data medium that is inserted therein (diskette 41) and the two side legs 44a, 44b (cf. FIG. 2) serving to fix and guide the diskette laterally and moreover providing the means for arrangement of the hinge fulcrums and articulation areas for the interconnecting means. Upper and lower hinge joints 2a, 2b are always snapped into side members 44a, 44b of the respective sleeve, thus permitting them to be assembled in an especially simple manner.

Each upper and lower hinge joint 2a, 2b (whose design is identical) includes a transverse connecting panel 3, whose ends, aligned along the U-shaped edging of each sleeve 1, form a transition into ribs 4, which are disposed perpendicular thereto. It is these ribs 4, whose own ends then form the fulcrums 5 for articulated storage in conjunction with each adjacent sleeve; in the practical example that is shown in FIG. 1, with front sleeve 1a and rear sleeve 1b. These articulated fulcrums can be designed in such a manner that cylindrical pivot pins 5 protrude in one piece from the ends of each rib, which can have axially extending slot 5a (as illustrated in FIG. 5) and counter-support for engagement of the pins. As illustrated, each of the counter-support recesses has an aperature 5c of reduced cross-sectional area that is narrower than the diameter of the pivot pins so that pivot pins 5 engage in a mutually resilient manner and subsequently catch in the counter-support recess of the sleeve. In order to allow the parallelogram guide mechanism that is formed in this manner to be effective when the individual sleeves are uniformly extended apart one from the other, it is necessary for each of the respective interconnecting means, i.e. upper and lower hinge joints 2a, 2b, to be pivotally engaged at a different vertical position on each front sleeve than on the lower sleeve, which is readily understandable, so that, when extended apart one from the other, the sleeves that were in a directly contacting relationship one with the other while in the diskette box formed in this manner will assume the oblique attitude one relative to the other that is shown in FIG. 1 or FIG. 3 and can simultaneously thus be opened equidistantly one from the other in such a manner as to permit visual inspection and/or removal of the diskette stored therein. In order to allow the sleeves to be in a directly contacting relationship one with the other while in the collapsed state, lateral ribs 4 of hinge joints 2a, 2b nest in appropriate recesses 6 in the edge of the sleeve and transverse connecting panels 3 nest in recesses 7 (cf. FIG. 3). The recesses, each formed toward the front and back by means of an oblique central wall or partition 6a, narrow in a tapering manner from the respective fulcrum so that, in the collapsed state shown in FIG. 4, about one half of each rib 4 nests in recess 6 of the adjacent front sleeve and one half in recess 6 of the adjacent rear sleeve. Of course, while other solutions would naturally be conceivable here, the illustrated distribution is advantageous because it is necessary for each hinge joint to form a fulcrum with the respective front sleeve and with the respective rear sleeve.

It is obvious that the respective hinge joints could also form the fulcrums for the parallelogram guidance mechanism by means of appropriate lateral pins or similar pivotal elements, which would then have to be inserted separately. As illustrated, the member receiving recesses 6 are contiguous, at one end, to the counter-support recesses. Each of the recesses 6, at the one end, has a stop surface 4b which is formed by transverse webs of the lateral edges of the sleeve which are located at a distance therefrom in the closed state; as can best be seen at 4c in FIG. 3, each rib 4 is rectangular and has a set of flattened corners 4a that engage a stop surface 4b to limit the expansion of the storage sleeves. Through the oblique positioning of the hinge joints with their connecting panels 3 when in the open state, the labelling areas 9 of stored diskettes 41 can be viewed immediately, thereby permitting a selected diskette to then be simply withdrawn upwardly. With the exception of the transverse connecting panels of the hinge joints, sleeves 1 are completely open to the front, i.e. as viewed from the left in the plane of the drawings in FIGS. 1 and 3—However when the diskette box is open, the lower edge 11 of transverse connecting panel 3 serves to limit forward movement of the diskette, while when the storage box is closed, entire transverse connecting panel 3 and, of course, panel-shaped back 42 of the respectively adjacent sleeve in front form the forward restriction for the diskette that is inserted therein. In order to allow the respective diskette to be withdrawn easily when the storage box is in the open state, the panel-shaped back can also have a cutout of suitable configuration, extending obliquely downward and then upward again, as shown at 42a, for example.

As a result of inclined transverse connecting panel 3 of the respective upper hinge joint 2a of each sleeve when the storage is in the open state, inclined transverse connecting panel 3 facilitates the insertion of the respective diskette, as it is merely necessary for it to be placed in the V-shaped opening that is formed by the respective transverse connecting panel and the sleeve, whereupon the diskette will then slide into the correct position by itself.

As can best be seen from the representation that is shown in FIG. 3, the hinge joints of the interconnecting means are (of necessity) missing on front sleeve 1a; consequently, a front panel 12 is disposed in order to prevent the diskette that is stored in this sleeve from falling out; front panel 12 is inserted permanently in the two free fulcrum recesses by means of suitable snap connectors 13.

In a preferred embodiment of the present invention, this front panel can, as shown at 14 in FIG. 5, also have a catch nose which latches in a recess 15 of a cover hood 16 which is also disposed, so that the storage box which is thus formed is held together and remains closed in a dust-tight manner for transport, for example. The dust-tight seal is produced by the U-shaped edge of the panel-shaped back of each sleeve, whose periphery is enclosed.

The practical example of the present invention that is shown in FIGS. 6 and 7 is similar to the storage box that is shown in the practical example in FIGS. 1-5 with respect to the parallelogram mechanism of the thusly interconnected sleeves; what is different, however, is that, while the design of the individual sleeves is otherwise identical—with the exception of the design of the hinge joint fulcrums—the fulcrums have been shifted here from the edges of each sleeve to the front and rear main surfaces thereof.

In this practical example, the storage box can be advantageously fabricated in one piece by means of a suitable injection moulding process, with sleeves 20 being designed in such a manner that they have a back panel 20a with an access cutout 20b and are at least partially edged by lateral and bottom retaining means for the plate- or disk-shaped item that is to be placed therein, i.e. for diskette 41, as a preferred embodiment of the present invention. As shown by the representation in FIG. 7, tongue-like interconnecting means extend from back panel 20a of each sleeve 20; in the special practical example that is shown in FIGS. 6 and 7, these tongue-like interconnecting means comprise hinge joints 21a, 21b, which are disposed at the top left and right respectively on the back of the sleeve, as well as a third hinge joint 22 which is seated centrally in the bottom part. As can be seen at 23, hinge joints 21a, 21b and 22 are comprised of elongated member having thinner material adjacent to the ends of the members, at the areas of articulation, thus producing film hinges of the plastic material of the hinge joints, which permit the storage sleeves for the diskettes to be fully collapsed and placed in a directly contacting relationship one with the other here, too, in that these film hinges form either a complete bend or extend in a straight line to implement the parallelogram guidance and fixation of the individual sleeves one relative to the other, with the respective thicker intermediate portions of the hinge joints nesting in corresponding recesses in the front and back of the sleeves.

It is obvious that the other side of each of the film hinges that are disposed at the top left and right and at the bottom center of each sleeve form film hinges with the front of the then adjacent rear sleeve in locations on the back which are vertically staggered relative to the first hinges—downwardly in the case of this embodiment—so that articulations result either at the bottom edge of the front of each sleeve or at a central transverse surface that connects the side members. Here, too, when the individual sleeves are extended apart from the closed state in the direction of double-headed arrow C, the upper viewing and grasping areas of each sleeve, in particular, also open, thereby permitting trouble-free visual inspection and selection, as well as manual access.

The representation in FIG. 6 shows the embodiment of a single-piece storage box of this type with parallelogram machanism that is injection moulded—It is therefore possible for the entire part to be fabricated in one piece from plastic, without the need for lateral slides, for example, which would make the injection moulding tool more expensive and complicated.

Since the film hinges serve as spring elements at fulcrums 23, the sleeves automatically separate when the cover hood, which has already been mentioned in conjunction with FIG. 5 and which can also be employed here, is removed. Similarly, they can also be readily collapsed again by pressing against the front and rear sides.

A further version of the present invention is shown in FIGS. 8 to 10; in this practical example, the individual sleeves are not interconnected one with the other by means of a parallelogram mechanism, but are prepared for performing an accordian-like opening motion through articulation at the top and bottom edges of each sleeve by means of connecting articulation members 31, which serve as interconnecting means so that, in the extended state, the respective sleeves 30 and connecting articulation members 31 are disposed in a V-shaped manner one relative to the other. It is obvious, and within the scope of the present invention, that the articulation of the connecting articulation members could also be effected laterally, i.e. laterally at the left, on the one hand, and laterally at the right, at the other, which would thus produce the same extendibility, with the only difference being that the insertion openings for the diskettes would be shifted 90°. However this represents the same fundamental principle for extending and separating the sleeves which are interconnected one with the other by means of connecting articulation members, which then extend obliquely.

Here, too, the joints can be implemented in the form of a pin and counter-support hole on the sleeves and the connecting articulation members—On the other hand, however, it is also possible for the joints to be implemented by means of the film hinges that have already been discussed in conjunction with FIGS. 6 and 7, so that it could then also be advantageous for the entire storage box to be fabricated in one piece by means of an injection moulding process in the case of a different opening procedure (accordian-like as opposed to a parallelogram mechanism).

As shown by the top view of the front elevation of one of the sleeves according to FIG. 9, the individual sleeves again comprise a back panel 30a having an access cutout 30b, a surrounding U-shaped edge 30c, which can also be enclosed, and to the side thereof, starting from about the center, inwardly protruding covering or guide rails 32, so that, even when the storage box is in the open position, each inserted diskette 41 is subjected to forward fixation. In the collapsed state, guide rails 32 nest in recesses 33 in connecting articulation members 31, so that here, too, there is no unnecessary thickness with respect to the overall thickness. It is obvious that the connecting articulation members, themselves, can be of any desired design; they can extend over the entire surface area of the front of the sleeve, in which case there will only be recesses 33 for guide rails 32, or they can merely consist of narrow ledges extending on both sides, which are then articulated to the respective forward sleeve at the top and to the respective following sleeve at the bottom.

In a preferred embodiment of the present invention, enclosure halves 34 and 35 can also be coupled in an articulated manner to the last connecting articulation member and to the first sleeve, respectively; taken together, partial enclosure covers 34, 35 form a complete, dust-tight enclosure, as can be seen from the representation shown in FIG. 10.

To open a storage box of the type shown in FIG. 10, it is practical to actuate catch noses which are disposed on the enclosure and which are suggested at 36 in the representation shown in FIG. 10, thereby permitting the front portion to be swung downward and the storage box to be opened by pulling on the partial enclosure covers. The sleeves then move into the oblique attitude that is shown in FIG. 8; they move apart, thereby permitting the diskettes that are stored therein to be quickly selected, easily identified and readily removed. The opening angle, and thus the spacing of the individual sleeves one relative to the other, is best accomplished by means of stops 37 and 38, which are disposed on the sleeves and on the connecting articulation members.

The present invention has been described above on the basis of preferred practical examples thereof. Obviously, many modifications and variations of the present invention are possible in the light of the above teachings. It should therefore be understood that, within the scope of the appended claims, the present invention may be practiced otherwise than as specifically described. In particular, individual characteristics of the invention can be employed individually or in combination one with the other.

What is claimed is:

1. A multisectional storage container for storing a plurality of plate-like items comprising: a plurality of storage sleeves for storing said items, said storage sleeves being arranged in line; and interconnecting means for interconnecting said storage sleeves so that said storage sleeves may be moved between a collapsed position in which said storage sleeves are stacked against each other and an expanded position in which said storage sleeves are spaced apart, said interconnecting means including a plurality of upper and lower mechanisms forming a parallelogram linkage, said upper mechanism including at least one elongated member and said lower mechanism including at least one elongated member and pivot means connecting one end of each of said members to one of said storage sleeves and the other end of each of said members to the next adjacent sleeve whereby said upper and lower members remain parallel to each other as the sleeves are moved between said collapsed and expanded positions.

2. The multisectional storage container according to claim 1 wherein: each of said storage sleeves comprises a back panel having a raised, peripheral edge of U-shaped configuration surrounding the sides and the bottom of said panel, said raised peripheral edge including a pair of spaced apart side legs at the said sides of said panel and a bottom leg, said to edge being cut out towrds said bottom edge so that a said item can be retrieved through said cut out when in a said storage sleeve; each of said upper and lower mechanisms includes a pair of said elongated members, said pairs of members being pivotably connected to said side legs of said storage sleeves, with one of said members of a said pair being located opposite to one of said members of the other of the said pairs on each of said side legs, whereby said items are operable to be retained within said connecting panels and said raised peripheral edge and when said storage sleeves are in their said expanded position said upper mechanism forms U-shaped receiving and introduction slot for a said item.

3. The multisectional storage container of claim 2 wherein said pivotable connection means comprises a set of pivot pins of cylindrical configuration connected to said ends of said members and said side legs have a set of counter-support recesses that are configured to pivotably receive the said pivot pins.

4. The multisectional storage container according to claim 3 wherein each of said counter-support recesses has an aperture of reduced cross-sectional area that is narrower than the diameter of said pivot pins and each of said pivot pins has an axially extending slot, whereby said pivot pins can be forced through said apertures by being compressed about their said axially extending slots for retention within said counter-support recesses.

5. The multisectional storage container according to claim 4 wherein at least one pair of adjacent storage sleeves has as set of recesses that are configured to nestably receive said members and said connecting panels when said storage sleeves are in their said collapsed position.

6. The multisectional storage device of claim 5 wherein each of said storage sleeves has a pair of opposed front and rear surfaces, said front surface has a set of recesses that are configured to nestably receive a portion of said members and said transverse connecting panels of one of said upper and lower mechanisms and each of said back surfaces has another set of recesses to nestably receive said members and said transverse connecting panels of another of said upper and lower mechanisms.

7. The multisectional storage container according to claim 6 wherein each of said members has a planar, rectangular rib-like configuration and a set of four flattened corners, and each of said receiving recesses, that receive said members, is contiguous, at one end, with a said counter-support recess and has, at its said one end, a stop surface to engage one of said flattened corners when said storage sleeves are in the said expanded position to limit the movement of said members and thus the expansion of said storage sleeves.

8. The multisectional storage container according to claim 7 further comprising a cover hood having an opening in one end to receive said storage sleeves when in their said collapsed position to form a storage box therewith.

9. The multisectional storage container according to claim 8 further including releasable engagement means for releasably engaging one of said storage sleeves to said cover hood.

10. The multisectional storage container according to claim 1 wherein each of said members are connected, at one end, to one of said storage sleeves and, at the other end, to the said next adjacent storage sleeve and said pivot means comprises a set of film hinges, each of which is located adjacent to a said end of each of said members.

11. The multisectional storage container according to claim 10 wherein each of said storage sleeves has a pair of opposed front and rear main surfaces and each of said members connects a said front main surface of one of said storage sleeves to a said rear main surface of said next adjacent storage sleeve.

12. The multisectional storage container according to claim 10 wherein said upper mechanism includes a pair of said members and said lower mechanism includes one member located between said pair of members of said upper mechanism so that the said container can be fabricated in the form of a one-piece injection molded component.

13. A multisectional storage container for storing a plurality of plate-like items comprising: a plurality of storage sleeves for receiving said items, said storage sleeves being arranged in line; and interconnecting means for interconnecting said storage sleeves so that said storage sleeves may be moved between a collapsed position in which said storage sleeves are stacked against one another and an expanded position in which said storage sleeves are spaced apart, said interconnecting means including a plurality of pairs of articulation members and pivot means for connecting one end of each of said articulation members to the top edge of one of said storage sleeves and the other of the ends of each of said articulation members to the bottom edge of the next adjacent storage sleeve, whereby each of said members forms a V-shape together with said adjacent storage sleeves that said members connects when said storage sleeves are in the said expanded position.

14. The multisectionl storage container according to claim 13 wherein each of said storage sleeves includes a back panel which has a raised peripheral edge of U-shaped configuration that forms the side and the bottom edges of said storage sleeve, a pair of centrally located, inwardly protruding guide rails that are connected to said peripheral edge opposite to one another at said side edges so that an item is operable to be retained within said raised edge and said guide rails, and the said top edge of said panel being cut out towards said bottom edge so that a said item can be retrieved through said cut out when in a said storage sleeve.

15. The multisectional storage container according to claim 14 wherein each of said articulation members is connected at the said one and other ends thereof to said top and bottom edges and said pivot means comprises a set of film hinges, each of which is located adjacent to a said end of each of said members so that said storage container can be fabricated from an injection molding process.

16. The multisectional storage container according to claim 14 wherein each of said articulation members has a guide rail receiving recess to nestably receive a said guide rail when said storage sleeves are in their said collapsed position.

17. The multisectional storage container of claim 16 further including a hollow enclosure that is sized to receive said storage sleeves when said storage sleeves are in their said collapsed position, said enclosure having a pair of enclosure halves that are operable to be brought into an abutting relationship with respect to one another to contain said storage sleeves therewithin, one of said enclosure halves being pivotably connected to said bottom edge of the first of said storage sleeves in said line and the other of said enclosure halves being pivotably connected to said other ends of the said pair of articulation members connected to the last of said storage sleeves in said line.

18. The multisectional storage device according to claim 17 wherein said enclosure halves have engageable means for releasably engaging said enclosure halves to one another when said storage sleeves are located within said enclosure halves.

* * * * *